(No Model.)　　　　　　　　　　　　　　2 Sheets—Sheet 1.
S. G. CABELL.
APPARATUS FOR PURIFYING WATER BY GALVANIC ACTION.
No. 552,413.　　　　　　　　　Patented Dec. 31, 1895.
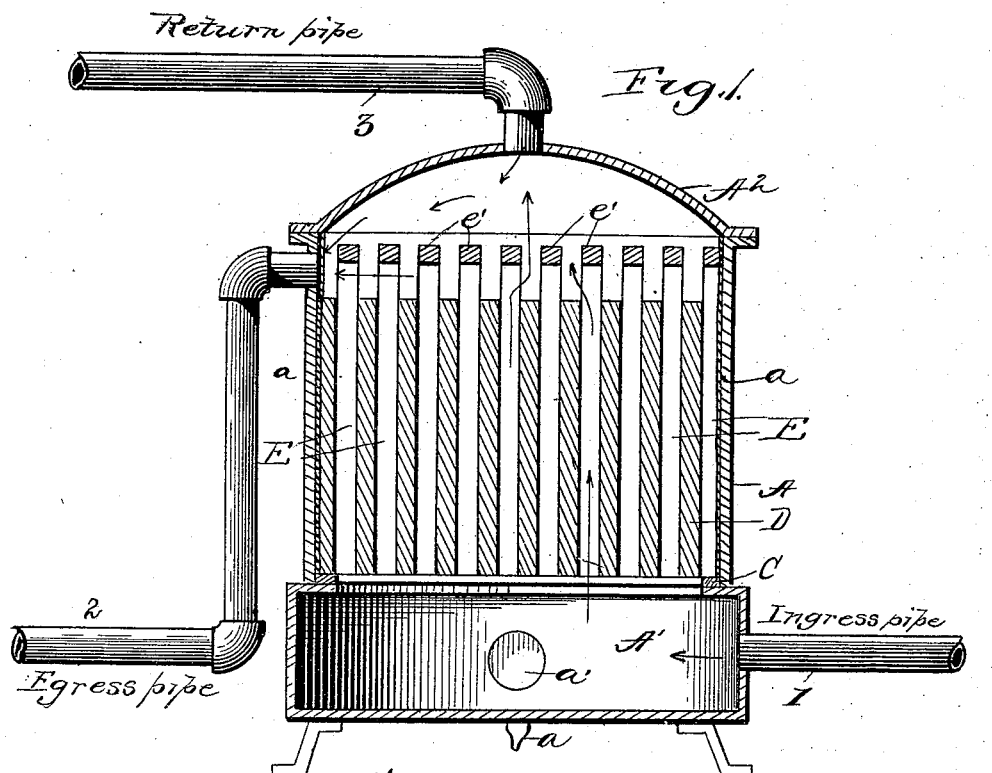
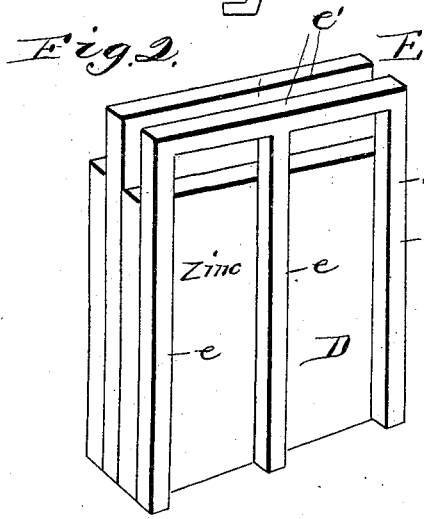
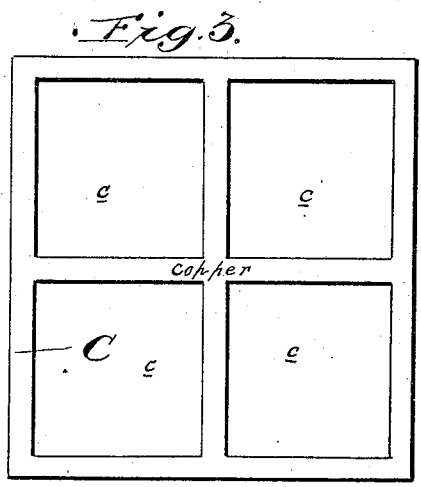
Witnesses
J. W. Fowler Jr.
Addison G. Du Bois
Inventor
Samuel G. Cabell
By Chas. Stockman
his Attorney (No Model.) 2 Sheets—Sheet 2.
S. G. CABELL.
APPARATUS FOR PURIFYING WATER BY GALVANIC ACTION.
No. 552,413. Patented Dec. 31, 1895.
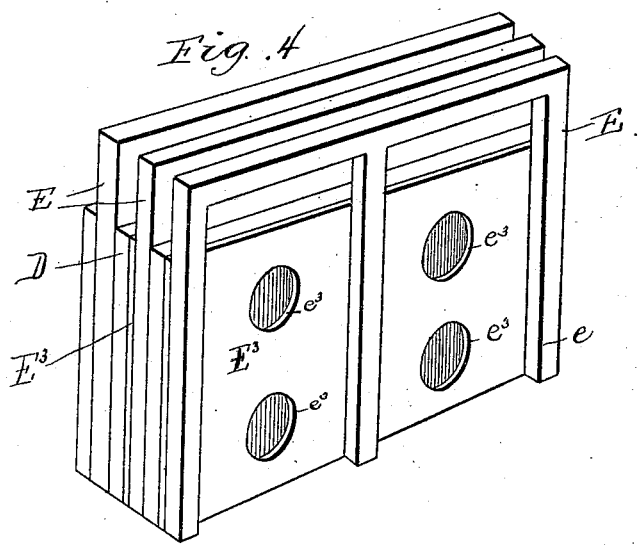
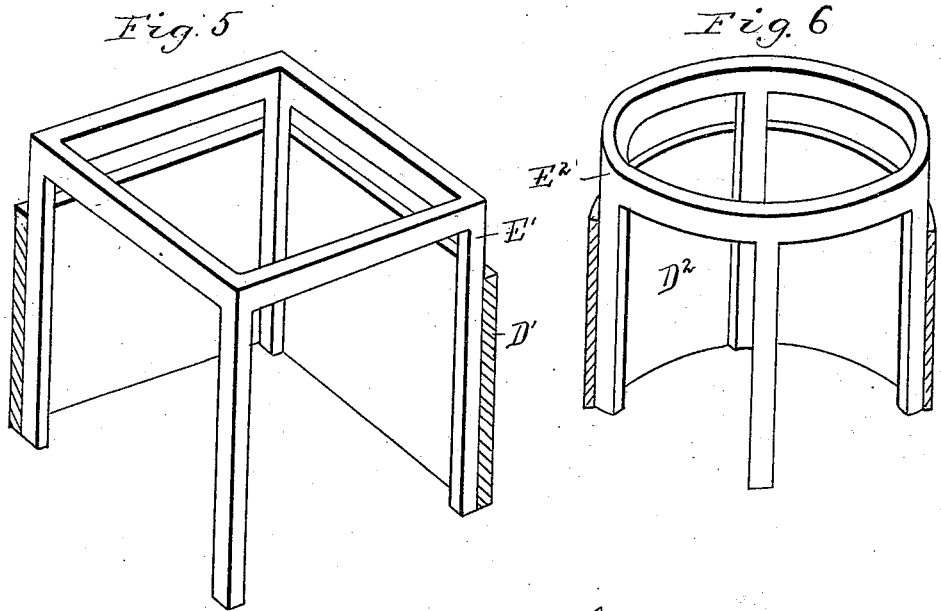

UNITED STATES PATENT OFFICE.

SAMUEL G. CABELL, OF WASHINGTON, DISTRICT OF COLUMBIA.

APPARATUS FOR PURIFYING WATER BY GALVANIC ACTION.

SPECIFICATION forming part of Letters Patent No. 552,413, dated December 31, 1895.

Application filed February 15, 1895. Serial No. 538,670. (No model.)

*To all whom it may concern:*

Be it known that I, SAMUEL G. CABELL, a citizen of the United States, residing at Washington, in the District of Columbia, have invented certain new and useful Improvements in Apparatus for Purifying Water by Galvanic Action; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to that class of feed-water purifiers which eliminate from the water the scale-producing impurities thereof by subjecting the same to galvanic action; and the invention consists in certain peculiarities in the construction and arrangement of the parts, substantially as hereinafter described, and particularly pointed out in the subjoined claims.

The object of my invention is to provide an apparatus of the class stated which will be of very simple construction and have a maximum efficiency. This object is accomplished by the construction illustrated in the accompanying drawings, in which—

Figure 1 is a sectional elevation of an apparatus embodying my invention. Fig. 2 is a perspective view of part of the battery constructed in accordance with my invention, and Fig. 3 is a detailed view of a form of device suitable for supporting the battery elements. Figs. 4, 5, and 6 represent modifications.

The same letters and numerals of reference designate the same parts in the several figures.

A designates the casing within which the water is purified, said casing having in its bottom a chamber A', into which the mud and other heavy impurities of the water are allowed to settle, and being provided at one side with an inlet-pipe 1, which may lead from a pump, and at its other side with an outlet-pipe 2, which leads to the bottom of the boiler, and at its top with a return-pipe 3, which leads from the upper part of the boiler and serves to introduce heated water and steam into the purifier. The sediment-collecting chamber A' is preferably provided with a blow-off cock $a$, through which mud and other impurities therein may be forced, as by the steam from the boiler taken through pipe 3, and also with a properly-covered hand-hole $a'$, through which such sediment may be taken by means of a suitable tool. It will be observed that in my present construction the outlet-pipe enters the chamber at the upper side of the latter and extends downward a proper distance outside the same and thence horizontally across to the boiler. This arrangement may be preferred; but I do not wish to be understood as limiting myself to it or to any other particular form or arrangement of pipes for the circulation of water, but reserve to myself the liberty of varying the same without departing from the spirit of the invention.

The present construction embodies broadly a horizontal frame or grating C, preferably forming an element of the battery, arranged within the casing above the inlet-port thereof, and a series of vertical positive and negative plates, each supported by said grating and spaced apart to afford water-passages.

The plates D are preferably imperforate and formed with flat surfaces, as shown, whereby they may be cheaply manufactured, and they are held in their proper relationship by the plates E alternating therewith. Each of said plates E preferably consists of a series of narrow plates $e$, arranged as shown, and connected at their tops by the strips $e'$, whereby a series of water-passages $e^2$ are formed between the plates D by the plates $e$ (said water-passages being bounded by the opposing faces of two adjacent plates D and opposing faces of two adjacent plates $e$) and the series of plates or arms $e$ of each plate E lifted together, or, to express it differently, the whole of each plate E may be lifted at once by grasping the cross-strip $e'$ thereof. Said cross-strips $e'$ are further advantageous in that they increase the strength of the galvanic action, and, when employed, they must be entirely above the tops of plates D, so as not to impede the flow of water, for which reason plates or arms $e$ extend above said plates D, as shown. It is preferred to form said plates D of zinc and frame C and plates E of copper. The interior of the casing may also be lined with copper, as shown at $a$.

The casing is preferably made square in cross-section, as such shape is obviously advantageous over the cylindrical when battery elements of the specific construction herein described and shown are employed; but it may be made cylindrical, or of any other suitable shape, without departing from the spirit of the invention.

From the above it will be seen that water entering the casing through pipe 1 will flow through the openings in the support C and the spaces between the plates D into the upper end of the casing and thence through pipe 2 to the boiler.

From the above it will be apparent that an apparatus constructed as above set forth provides a considerable amount of surface of electropositive and electronegative metals in in contact with each other and with the water, whereby the intensity of the galvanic action produced is materially increased, and that this advantageous result is derived from a very simple, inexpensive, and small structure. It will further be seen that the electro positive and negative metals are readily removable from each other, and that, as the casing is provided with a removable cap or cover $A^2$, said elements may be quickly removed from and replaced within the casing whenever desired. It is also apparent that the particular construction of the plates D and E above set forth may be made much cheaper than the corresponding elements heretofore proposed for this type of apparatuses—that is to say, for apparatuses for purifying water by galvanic action in which the water flows through the casing in a direction parallel with the length of the galvanic-action producing elements—and also that any one of the plates may be removed without necessitating the removal of any of the other plates.

I do not wish to be understood as limiting myself to the use of zinc and copper as the metals for producing galvanic action, as any other suitable couples may be employed without departing from the spirit of the invention, nor do I wish to be understood as limiting myself to the specific construction of the plates, nor to plates of any particular shape, as it is within the scope and intent of my invention to form the plates of any suitable shape or form. For example, in Fig. 5, a construction is indicated in which the zinc plates designated D' are in the form of hollow squares and the copper plates lettered E' are similarly varied as to shape, and in Fig. 6 a construction is indicated in which the zinc plates lettered $D^2$ are tubes, and the shape of the copper plates designated $E^2$ is correspondingly changed.

While I have shown but one of each plate in the above modifications it will be apparent that the best results will be obtained by employing a series of each element alternating one with the other, and my invention contemplates such arrangement. It will also be obvious that the elements are of gradually decreasing diameter from the outermost one to the one in the longitudinal center of the casing, so that they will set closely one within another.

In Fig. 4 is shown a modification in which supplemental copper plates $E^3$ are interposed between the plates D and E, each of said supplemental plates having openings $e^3$, through which any water that may get between plates D and $E^3$ may find an outlet.

Having now described my invention, what I believe to be new, and desire to secure by Letters Patent, is—

1. In an apparatus for purifying water by galvanic action, the combination of the vertical casing having ports near its bottom and top, a horizontal grating arranged above the lower port, and a series of vertical positive and negative plates, arranged on the grating and spaced apart to afford water passages, substantially as described.

2. In an apparatus for freeing water from scale-producing impurities by galvanic action, the combination with the casing having inlet and outlet ports, of a series of imperforate plates extending longitudinally thereof and forming one battery element, and a series of sets of narrow plates arranged between said imperforate plates and alternating therewith to form a series of water passages between each pair of imperforate plates, said narrow plates forming the other battery element.

3. In an apparatus for freeing water from scale-producing impurities by galvanic action, the combination with the casing having inlet and outlet ports, and a supporting plate having openings for the passage of water, of a series of plates, as D, extending longitudinally of said casing and independently supported by said supporting-plate, and a series of sets of narrow plates, as $e$, alternating with said plates D and independently supported by said supporting plate, said plates being relatively arranged to form water passages between each pair of plates D and in register with the openings through said supporting plate, and said supporting plate and plates D being formed of an electro-positive metal and said plates $e$ being formed of a relatively electro-negative metal, substantially as described.

4. In an apparatus for freeing water from scale-producing impurities by galvanic action, the combination with the casing having inlet and outlet ports, of the series of imperforate plates extending longitudinally thereof and forming one battery element, and a series of sets of narrow plates, arranged between said imperforate plates and alternating therewith to form a series of water passages between each pair of imperforate plates, said narrow plates forming the other battery element, and a supporting plate, engaged by one end of each of said imperforate and narrow plates and having openings for the passage of water, substantially as described.

5. In an apparatus for freeing water from scale-producing impurities by galvanic action, the combination with the casing having inlet and outlet ports, of a series of imperforate plates, the series of sets of narrow plates alternating with said imperforate plates and arranged to provide water passages between each pair of the latter, and connecting strips for said sets of narrow plates, said imperforate and narrow plates and connecting strips being formed of relatively electro-positive and negative metals, substantially as described.

6. In an apparatus for freeing water from scale-producing impurities by galvanic action, the combination with the casing having inlet and outlet ports, of flat plates in said casing, and a series of sets of narrow plates alternating with said flat plates and arranged to provide water passages between the pairs of the latter, said narrow plates extending above said flat plates, strips connecting together the narrow plates of each set thereof and located entirely above the tops of said flat plates, said flat plates and the narrow plates and connecting strips being formed of relatively electro-positive and negative metals, substantially as described.

7. In an apparatus for freeing water from scale producing impurities by galvanic action, the combination with the casing having inlet and outlet ports, of flat plates extending longitudinally within said casing, said plates being arranged to provide water passages between them, the series of sets of narrow plates alternating with the flat plates and extending above the same, the connecting strips for said narrow plates located entirely above said flat plates, and a support for said plates having openings registering with the openings between said flat plates, said plates and support being formed of electro-positive and negative metals, substantially as described.

8. In an apparatus for freeing water from scale producing impurities by galvanic action, the combination with the casing having inlet and outlet ports, of flat plates extending longitudinally within said casing, said plates being arranged to provide water passages between them, the series of sets of narrow plates alternating with said flat plates and extending above the same, the connecting strips for said narrow plates located entirely above said flat plates, and a removable support upon which said plates are loosely mounted, said support having openings registering with said water passages between the flat plates, and said plates, connecting strips and support being formed of relatively electro-positive and negative metals, substantially as described.

In testimony whereof I affix my signature in presence of two witnesses.

SAMUEL G. CABELL.

Witnesses:
  H. K. SIMPSON,
  CHAS. J. STOCKMAN.